United States Patent

Ogawa

(10) Patent No.: US 9,178,448 B2
(45) Date of Patent: Nov. 3, 2015

(54) POWER CONVERSION DEVICE

(71) Applicant: FUJI ELECTRIC CO., LTD., Kawasaki (JP)

(72) Inventor: Shogo Ogawa, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 31 days.

(21) Appl. No.: 14/154,841

(22) Filed: Jan. 14, 2014

(65) Prior Publication Data

US 2014/0203740 A1   Jul. 24, 2014

(30) Foreign Application Priority Data

Jan. 18, 2013   (JP) .................. 2013-007323

(51) Int. Cl.
*H02P 3/00* (2006.01)
*H02P 3/22* (2006.01)
*H02P 29/02* (2006.01)

(52) U.S. Cl.
CPC ................ *H02P 3/22* (2013.01); *H02P 29/024* (2013.01)

(58) Field of Classification Search
CPC ..... H02H 7/122; H02H 9/041; H02H 29/024; H02H 3/14; H02H 3/22
USPC .......... 318/375, 376, 400.21, 400.22, 400.26, 318/722
See application file for complete search history.

(56) References Cited

U.S. PATENT DOCUMENTS

| | | | | |
|---|---|---|---|---|
| 3,694,722 A | * | 9/1972 | Reed | 318/368 |
| 5,291,106 A | * | 3/1994 | Murty et al. | 318/375 |
| 5,420,491 A | * | 5/1995 | Kanzaki et al. | 318/727 |
| 5,455,496 A | * | 10/1995 | Williams et al. | 318/563 |
| 6,005,359 A | * | 12/1999 | Brambilla et al. | 318/368 |
| 7,075,257 B2 | * | 7/2006 | Carrier et al. | 318/375 |
| 7,170,245 B2 | * | 1/2007 | Youm | 318/375 |
| 2007/0063661 A1 | * | 3/2007 | Galli et al. | 318/109 |
| 2013/0271046 A1 | * | 10/2013 | Sussman | 318/379 |

FOREIGN PATENT DOCUMENTS

| | | |
|---|---|---|
| EP | 1503074 A1 | 2/2005 |
| JP | 09-124901 | 5/1997 |
| JP | 2002-069661 A | 3/2002 |
| JP | 2005-045905 A | 2/2005 |

OTHER PUBLICATIONS

"Study of the Trace Element State in Metal", pp. 71-77.
Nomura et al. " Adhesion Characteristic of Copper Alloys to Mold Resin as a IC Leadframe", Kobe Steel Engineering Reports, vol. 48, No. 3, pp. 21-24, Dec. 1998.

* cited by examiner

*Primary Examiner* — Bentsu Ro
*Assistant Examiner* — Thai Dinh
(74) *Attorney, Agent, or Firm* — Rabin & Berdo, P.C.

(57) ABSTRACT

A power conversion device for driving a load, including a power conversion device main body configured to receive an input of a power supply voltage and to drive the load, and a brake circuit configured to protect the power conversion device main body from overvoltage applied thereto. The brake circuit includes a Zener diode that becomes conductive when the voltage applied to the power conversion device main body exceeds a predetermined value, to thereby suppress the voltage.

4 Claims, 3 Drawing Sheets

POWER CONVERSION DEVICE

CROSS REFERENCE TO RELATED APPLICATION

This application claims the priority of a corresponding Japanese patent application, Serial No. JP PA 2013-007323, filed Jan. 18, 2013, the entire content of which is hereby incorporated by reference.

BACKGROUND OF THE INVENTION

1. Field of the Invention

The present invention relates to a power conversion device including a protection function with respect to regenerative power from a load.

2. Description of the Background Art

A large number of power conversion devices, typified by inverter devices, are used as drive devices that drive a load such as a motor. This type of power conversion device, in outline, is configured so as to switch an input power supply voltage, which is a rectified commercial power supply, via a semiconductor switching element such as an IGBT (insulated-gate bipolar transistor) or MOSFET (metal-oxide-semiconductor field-effect transistor), thus generating power, for example a three-phase alternating current power, that drives the load (e.g. a motor).

Specifically, a power conversion device 1, as shown in a main portion schematic configuration thereof in FIG. 3, includes a power conversion device main body (inverter device) 2 that switches a direct current power supply voltage Vin, thus generating a three-phase alternating current power that drives a load (motor) M, and a brake circuit 3, provided parallel to the power conversion device main body 2, that protects the power conversion device main body 2 from overvoltage. Reference sign 4 in the drawing is a power supply switch (breaker), reference sign 5 is a rectifier circuit that rectifies an input alternating current voltage Vac, and reference sign 6 is an input capacitor (smoothing capacitor) that smoothes the output voltage of the rectifier circuit 5. The direct current power supply voltage Vin obtained via the input capacitor 6 is supplied to the power conversion device main body 2.

Herein, the brake circuit 3 is installed, for example, between power supply lines of the direct current power supply voltage Vin, and is formed of a series circuit (semiconductor switching circuit) of a resistor 3a and semiconductor switching element (for example, an IGBT) 3b, and a surge voltage absorbing diode 3c connected in parallel to the resistor 3a. The brake circuit 3 forms a current bypass path for the power conversion device main body 2 when the semiconductor switching element 3b is conductive, and performs a role of suppressing (reducing) the direct current power supply voltage Vin applied to the power conversion device main body 2 by causing current to flow through the resistor 3a, thus consuming power.

Also, a control circuit 7 that drives the brake circuit 3 includes, for example, a DC-DC converter 7a, which steps down and detects the direct current power supply voltage Vin, and a comparator 7b that compares the voltage detected by the DC-DC converter 7a and a reference voltage. Further, the control circuit 7 is configured so as to bias a drive circuit 7c when a direct current power supply voltage Vin exceeding a predetermined value (protection voltage) is detected by the comparator 7b, and make conductive and drive the semiconductor switching element 3b of the brake circuit 3 in response to a protection signal output by the drive circuit 7c.

The function of monitoring the direct current power supply voltage Vin, and protecting the power conversion device main body 2 by driving the brake circuit 3 when the direct current power supply voltage Vin becomes an overvoltage, in this way is as introduced in detail in, for example, JP-A-2005-27424.

SUMMARY OF THE INVENTION

However, when a braking force is applied to the load (motor) M driven by the power conversion device 1, regenerative power is generated in the load M. Then, the direct current power supply voltage Vin rises due to a regenerative current flowing into the power conversion device 1 in accompaniment to the generation of the regenerative power. In general, however, the rise in the direct current power supply voltage Vin due to the regenerative current is sharp in comparison with the response characteristics (operation delay) of the control circuit 7. Because of this, it is difficult to counteract a rise in the direct current power supply voltage Vin due to regenerative power in the brake circuit 3. As a result, there is concern about not only the power conversion device main body 2, but also the input capacitor 6 and the like, being damaged by overvoltage.

The invention relates to a power conversion device with a simple configuration, such that it is possible to swiftly absorb regenerative power from the load that causes a sharp rise in the direct current power supply voltage Vin, and to thus protect the power conversion device main body from overvoltage.

A power conversion device according to an aspect of the invention includes a power conversion device main body into which a power supply voltage is input and which drives a load, and a brake circuit that protects the power conversion device main body from overvoltage applied to the power conversion device main body. A Zener diode that becomes conductive when the voltage applied to the power conversion device main body exceeds a predetermined value, thus suppressing the voltage applied to the power conversion device main body, is provided in the brake circuit.

Specifically, the brake circuit includes, for example, a semiconductor switch circuit that, when conductive, forms a bypass current path with respect to the power conversion device main body, thus consuming excess power. The Zener diode is provided so as to become conductive when voltage applied to the power conversion device main body due to regenerative power from the load exceeds a predetermined value, thus driving the semiconductor switch circuit. Also, at the same time, the Zener diode, by being conductive, performs a role of limiting the voltage applied to the power conversion device main body to the breakdown voltage of the Zener diode.

Incidentally, the Zener diode is installed, for example, between a positive electrode line to which the power supply voltage is applied and a control terminal of the semiconductor switch circuit. Further, the brake circuit is driven preferably by the Zener diode, or by a control circuit that monitors the power supply voltage and outputs a protection signal when the power supply voltage exceeds a predetermined value.

According to the power conversion device with the heretofore described configuration, when the direct current power supply voltage applied to the power conversion device main body exceeds the breakdown voltage of the Zener diode due to regenerative power from the load, the semiconductor switch circuit in the brake circuit is swiftly made conductive and driven by the current flowing through the Zener diode. Therefore, a regenerative current flows through a resistor in the semiconductor switch circuit, and the regenerative power is swiftly consumed, even when the response characteristics of the control circuit that drives the brake circuit are poor.

As such, a rise in the direct current power supply voltage caused by regenerative power is effectively suppressed, and it is possible to protect the power conversion device main body from overvoltage, thus forestalling damage thereto. Moreover, it is possible to effectively protect the power conversion device main body from regenerative power with a simple configuration in which, for example, the Zener diode is installed between the positive electrode line to which the power supply voltage is applied and the control terminal of the semiconductor switch circuit, to which there are considerable practical advantages.

DETAILED DESCRIPTION OF THE INVENTION

Figure 1:
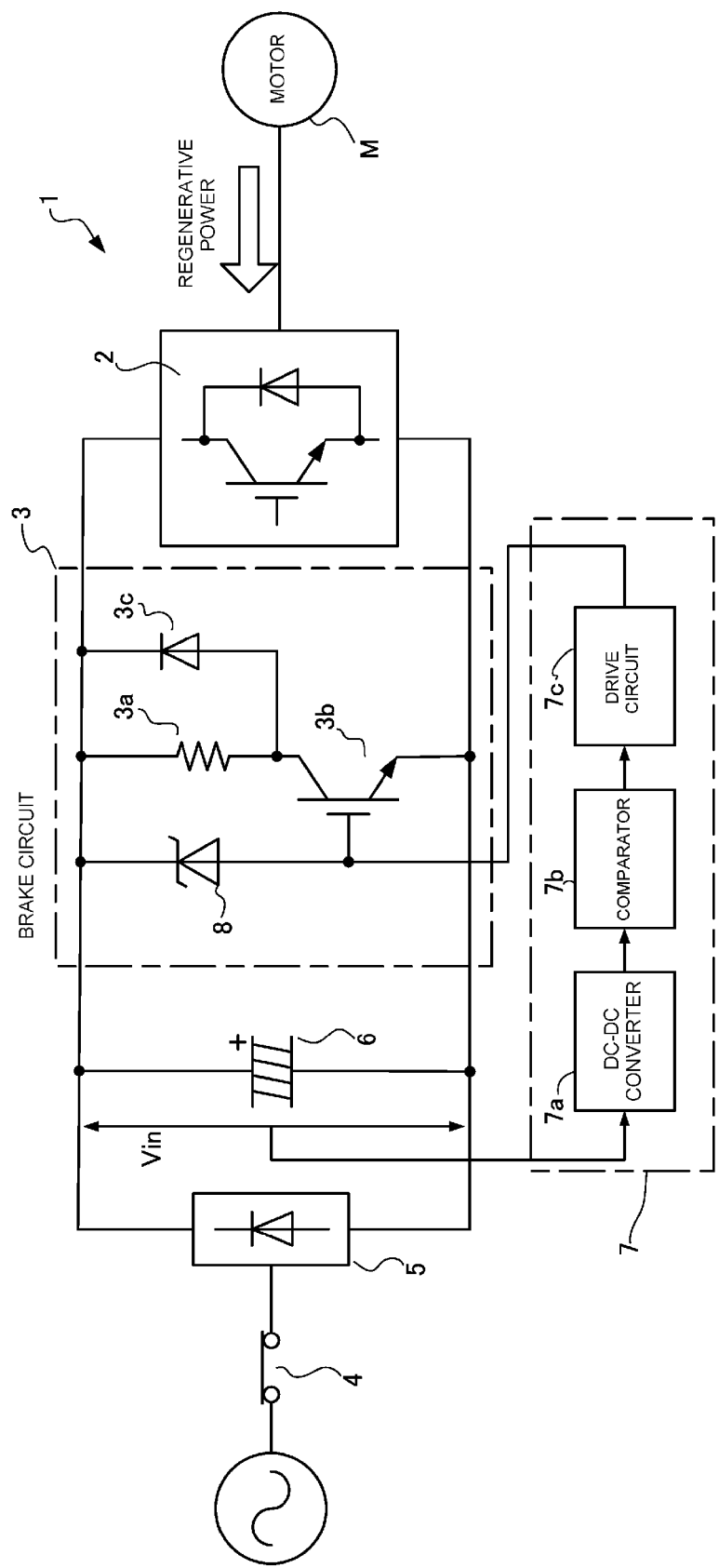
FIG. 1 is a main portion schematic configuration diagram of a power conversion device according to one embodiment of the invention.

Hereafter, referring to the drawings, a description will be given of a power conversion device according to embodiments of the invention.

Figure 3:
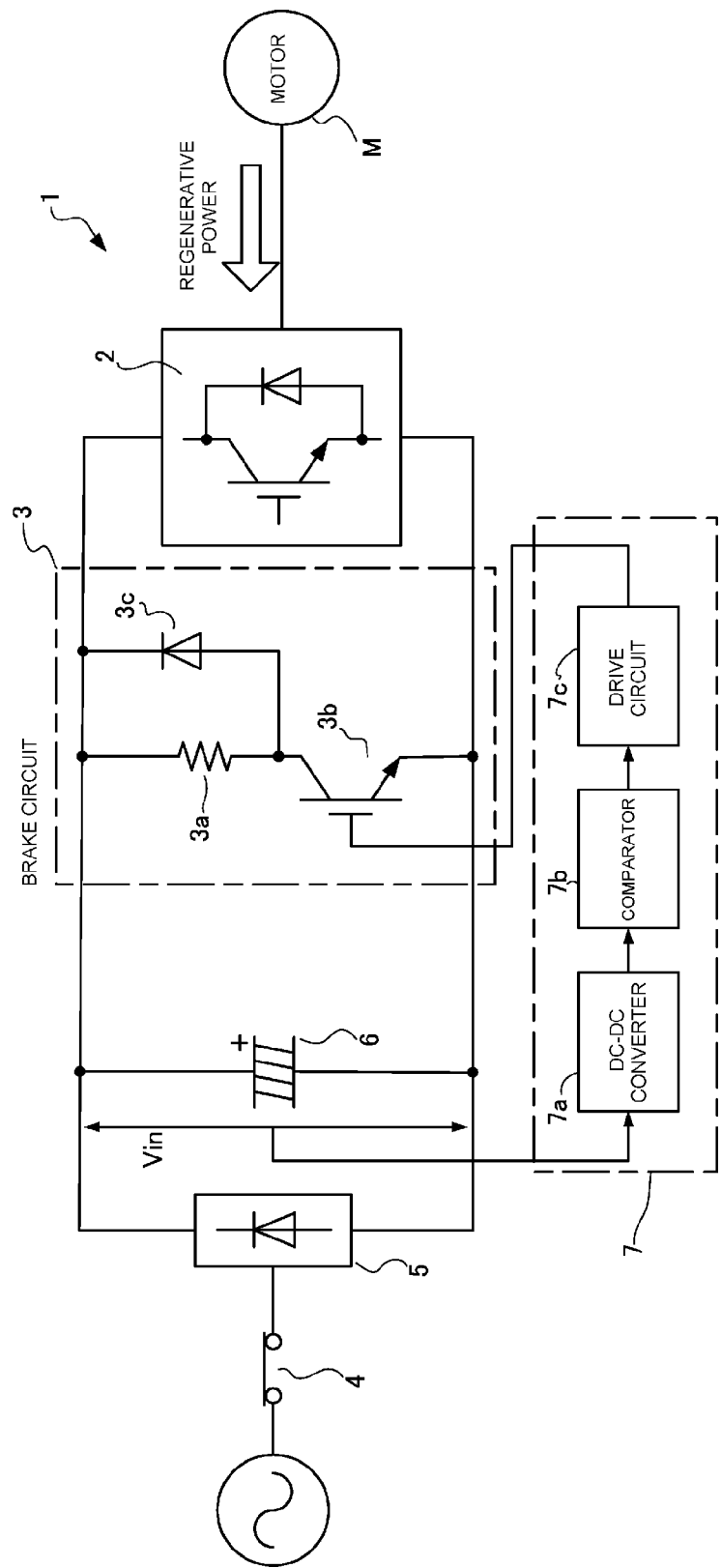
FIG. 3 is a main portion schematic configuration diagram of a power conversion device including a heretofore known general overvoltage protection function (brake circuit).

A power conversion device 1 according to the invention is basically configured to include a power conversion device main body (inverter circuit) 2 and a brake circuit 3 connected in parallel to the power conversion device main body 2, in the same way as a heretofore known power conversion device shown in FIG. 3. Consequently, the same reference signs are given to portions the same as those of the heretofore known device, and a description thereof will be omitted.

The power conversion device 1 according to this embodiment is characterized in that a Zener diode 8 is installed between a positive electrode line of a direct current power supply voltage Vin and the gate of a semiconductor switch 3b (the control terminal of a semiconductor switching circuit) in the brake circuit 3, as shown in a main portion schematic configuration diagram in FIG. 1. The Zener diode 8 is formed of, for example, a diode having breakdown voltage characteristics of the same extent as a pre-set maximum limit voltage (protection voltage), which protects the power conversion device main body 2 from a rise in the direct current power supply voltage Vin.

Specifically, when the power conversion device main body 2 is an inverter device that drives a load M by outputting a 200V alternating current voltage Vac, a Zener diode 8 having breakdown voltage characteristics of, for example, 350V is used. Alternatively, when the power conversion device main body 2 is an inverter device that drives the load M by outputting a 400V alternating current voltage Vac, a Zener diode 8 having breakdown voltage characteristics of, for example, 800 to 850V is used.

The Zener diode 8 has a characteristic of, when a reverse voltage applied between the anode and cathode thereof exceeds a breakdown voltage Vzd of the Zener diode 8, causing a current due to avalanche breakdown to flow from the cathode toward the anode. As it is commonly known that the Zener diode 8 performs an action restricting the reverse voltage applied between the anode and cathode to the breakdown voltage Vzd at this time, there is no need to give a description here.

According to the power conversion device 1 configured to include this kind of Zener diode 8, even when a braking force is applied to the load (motor) M driven by the power conversion device 1, and regenerative power generated thereby in the load M is applied to the power conversion device 1, it is possible to effectively protect the power conversion device 1 from the regenerative power. That is, on a regenerative current from the load (motor) M flowing into the power conversion device 1 side, the direct current power supply voltage Vin rises in response thereto. Moreover, the rise in the direct current power supply voltage Vin caused by the regenerative current is generally sharp.

Further, on the direct current power supply voltage Vin exceeding (rising above) the breakdown voltage Vzd of the Zener diode 8 in accompaniment to the rise in the direct current power supply voltage Vin, an avalanche breakdown occurs in the Zener diode 8 as a result thereof. As a result of this, current flows into the Zener diode 8 in accompaniment to the rise in the direct current power supply voltage Vin, and the semiconductor switch 3b in the brake circuit 3 is made conductive and driven by the current.

Then, owing to the semiconductor switch 3b being conductive, the regenerative current flows through a resistor 3a and is consumed, because of which the rise in the direct current power supply voltage Vin is suppressed. Further, the direct current power supply voltage Vin is restricted to the breakdown voltage Vzd of the Zener diode 8. The semiconductor switch 3b in the brake circuit 3 being made conductive and driven by the Zener diode 8 precedes the brake circuit 3 (semiconductor switch 3b) being made conductive and controlled by a control circuit 7, in which there is a response delay of a DC-DC converter 7a, and the like.

Subsequently, the control circuit 7 detects the rise in the direct current power supply voltage Vin, and makes conductive and drives the semiconductor switch 3b of the brake circuit 3. Then, the drive of the brake circuit 3 by the control circuit 7 is executed continuously until the direct current power supply voltage Vin falls to or below the protection voltage with respect to the power conversion device main body 2. As a result, the power conversion device main body 2 is effectively protected from overvoltage by the drive of the brake circuit 3 by the Zener diode 8 and control circuit 7. In particular, the power conversion device main body 2 can easily be effectively protected from overvoltage by the action of the Zener diode 8, even when there is a sharp rise in the direct current power supply voltage Vin caused by regenerative power.

Consequently, according to the power conversion device 1 with the heretofore described configuration, it is possible to reliably protect the power conversion device main body 2 from regenerative power generated in the load M with a simple configuration in which the Zener diode 8 that drives the brake circuit 3 is provided. Moreover, even when the response characteristics of the control circuit 7 with respect to a rise in the direct current power supply voltage Vin are slow, or when a power supply switch (breaker) 4 is in an off-state and the control circuit 7 does not operate, it is possible to reliably cause the brake circuit 3 to operate when there is a rise in the direct current power supply voltage Vin due to regenerative power, thus reliably protecting the power conversion device main body 2. Consequently, there are considerable practical advantages.

Figure 2:
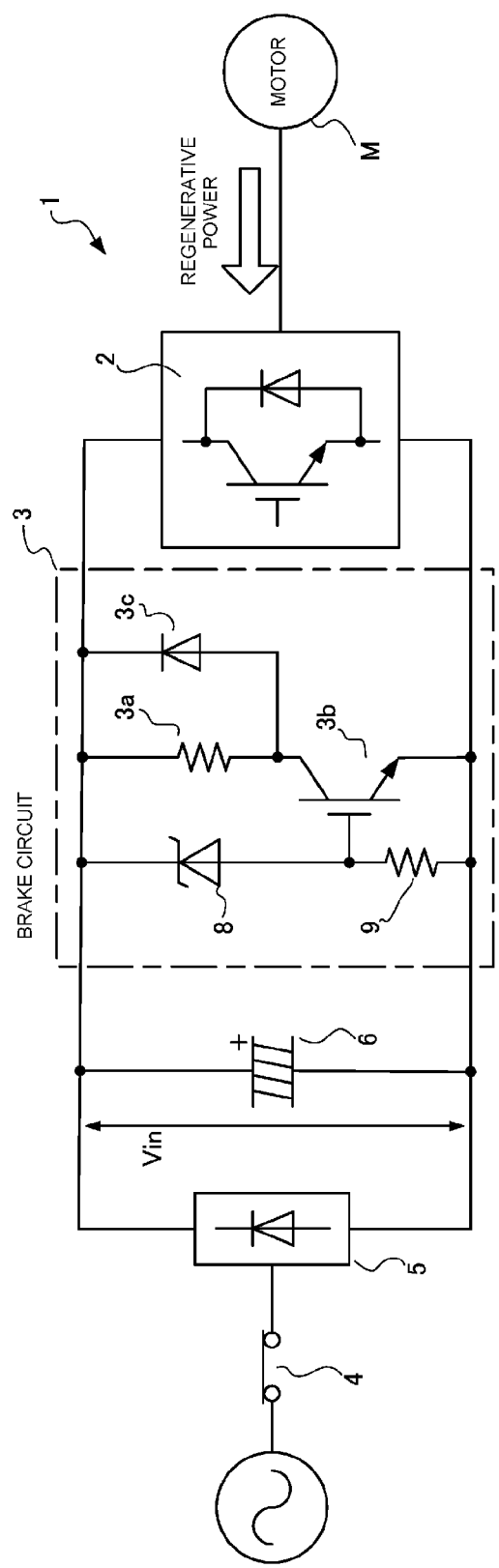
FIG. 2 is a main portion schematic configuration diagram of a power conversion device according to another embodiment of the invention.

However, even when the power conversion device 1 does not include the control circuit 7, as shown in FIG. 2, the Zener diode 8 acts effectively on the brake circuit 3. In this case, a load resistor 9 is connected in series with the Zener diode 8, and this series circuit is installed between the power supply lines of the power supply voltage Vin. Further, it is sufficient that a configuration is such that voltage generated in the load resistor 9 by current flowing through the Zener diode 8 is applied to the semiconductor switch 3*b* in the brake circuit 3.

According to the power conversion device 1 configured in this way, when the direct current power supply voltage Vin applied to the power conversion device 1 by regenerative current from the load (motor) M exceeds the breakdown voltage Vzd of the Zener diode 8, an avalanche breakdown current flows through the Zener diode 8. Then, voltage breakdown occurs in the load resistor 9 due to this current, and the semiconductor switch 3*b* is made conductive by this voltage. As a result of this, in the same way as in the previous embodiment, current flows through the resistor 3*a* and the regenerative power is consumed, because of which the direct current power supply voltage Vin is suppressed, and it is thus possible to protect the power conversion device main body 2 from overvoltage.

Consequently, the same advantages as in the previous embodiment are obtained.

The invention is not limited to the heretofore described embodiments. For example, instead of the semiconductor switch 3*b* being driven directly by the current flowing through the Zener diode 8, it is also possible for a light emitting element of a photocoupler to be driven by the current flowing through the Zener diode 8, and the semiconductor switch 3*b* driven by electromotive force obtained from a light receiving element of the photocoupler. Also, with regard also to the brake circuit 3, it is possible to use a MOSFET or bipolar transistor as the semiconductor switch 3*b*, and furthermore, the brake circuit 3 can also be realized as a configuration including, for example, a capacitor that absorbs regenerative power.

Also, with regard also to the control circuit 7 that monitors the direct current power supply voltage Vin and drives the brake circuit 3, it is possible to employ as appropriate various heretofore proposed power supply voltage monitor circuits. Furthermore, with regard also to the power conversion device main body 2, the configuration thereof is not limited. That is, provided that the power conversion device according to the invention is characterized by an excessive rise in the direct current power supply voltage Vin caused by regenerative power being detected, and the brake circuit 3 being caused to operate, using the Zener diode 8, and the power conversion device main body 2 being thereby protected from overvoltage, various modifications to the embodiment of the power conversion device are possible, without departing from the scope of the invention.

What is claimed is:

1. A power conversion device for driving a load, comprising:
   a power conversion device main body configured to receive an input of a power supply voltage, and to drive the load; and
   a brake circuit configured to protect the power conversion device main body from overvoltage applied thereto, the brake circuit including
      a semiconductor switch circuit that, when conductive, forms a bypass current path with respect to the power conversion device main body, thus consuming excess power, and
      a Zener diode that is connected between a positive electrode line, via which the power supply voltage is applied to the power conversion device main body, and a control terminal of the semiconductor switch circuit, the Zener diode becoming conductive when the voltage applied to the power conversion device main body exceeds a predetermined value, to thereby suppress the voltage.

2. The power conversion device according to claim 1, wherein
   the Zener diode becomes conductive when the voltage applied to the power conversion device main body exceeds the predetermined value due to regenerative power from the load, to thereby drive the semiconductor switch circuit.

3. The power conversion device according to claim 1, wherein
   the Zener diode becomes conductive when the voltage applied to the power conversion device main body exceeds the predetermined value due to regenerative power from the load, thus limiting the voltage applied to the power conversion device main body to the breakdown voltage of the Zener diode.

4. The power conversion device according to claim 1, wherein
   the brake circuit is driven by the Zener diode, or by a control circuit that monitors the power supply voltage and outputs a protection signal when the power supply voltage exceeds the predetermined value.

* * * * *